(12) United States Patent
Kathail et al.

(10) Patent No.: US 7,818,616 B2
(45) Date of Patent: Oct. 19, 2010

(54) WARM REBOOT ENABLED KERNEL DUMPER

(75) Inventors: Pradeep Kumar Kathail, Los Altos, CA (US); Vignesh Dayanand Shetty, Bangalore (IN); Navneet Agarwal, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 419 days.

(21) Appl. No.: 11/860,510

(22) Filed: Sep. 24, 2007

(65) Prior Publication Data

US 2009/0031166 A1  Jan. 29, 2009

(30) Foreign Application Priority Data

Jul. 25, 2007  (IN)  ........................ 1566/DEL/2007

(51) Int. Cl.
*G06F 11/00* (2006.01)

(52) U.S. Cl. .............................. 714/15; 714/36; 714/38; 713/1; 713/2

(58) Field of Classification Search ...................... 713/1, 713/2; 714/2, 36, 38, 45, 15
See application file for complete search history.

(56) References Cited

U.S. PATENT DOCUMENTS

| | | | | |
|---|---|---|---|---|
| 5,317,752 A * | 5/1994 | Jewett et al. | ................... | 714/14 |
| 5,557,777 A * | 9/1996 | Culbert | ........................ | 713/2 |
| 6,226,761 B1 * | 5/2001 | Berstis | ........................ | 714/37 |
| 6,636,963 B1 * | 10/2003 | Stein et al. | ..................... | 713/1 |
| 6,643,802 B1 * | 11/2003 | Frost et al. | ..................... | 714/37 |
| 6,654,880 B1 * | 11/2003 | Yamamoto | ..................... | 713/1 |
| 6,681,348 B1 * | 1/2004 | Vachon | ........................ | 714/45 |
| 6,728,907 B1 * | 4/2004 | Wang et al. | ................... | 714/47 |
| 6,898,736 B2 * | 5/2005 | Chatterjee et al. | ............. | 714/37 |
| 6,965,989 B1 * | 11/2005 | Strange et al. | ................. | 713/1 |
| 7,028,056 B1 * | 4/2006 | Hendel et al. | ............... | 707/202 |
| 7,237,232 B2 * | 6/2007 | Smith | ......................... | 717/130 |
| 7,281,163 B2 * | 10/2007 | Brown et al. | ................. | 714/31 |
| 7,337,365 B2 * | 2/2008 | Zunino et al. | ................ | 714/38 |
| 7,346,809 B2 * | 3/2008 | Blanchard et al. | ............. | 714/37 |
| 7,437,524 B2 * | 10/2008 | Narayan et al. | ............. | 711/161 |
| 7,484,127 B2 * | 1/2009 | Babu | .......................... | 714/38 |
| 7,496,794 B1 * | 2/2009 | Eastham et al. | .............. | 714/37 |
| 7,506,203 B2 * | 3/2009 | Nellitheertha | ................ | 714/20 |
| 7,509,521 B2 * | 3/2009 | Iwakura et al. | ................. | 714/5 |

(Continued)

FOREIGN PATENT DOCUMENTS

JP           08292904 A   * 11/1996

OTHER PUBLICATIONS

Wadhawan Anupam, New ION Kernel Dumper Software Functional / Design Specification, 16 pgs, Cisco Systems, Inc.

*Primary Examiner*—Robert Beausoliel
*Assistant Examiner*—Joshua P Lottich
(74) *Attorney, Agent, or Firm*—Patent Capital Group (57) ABSTRACT

In one embodiment, a method of a kernel dumper module includes generating a dump file associated with a kernel when the kernel crashes, storing the dump file to a functional memory upon applying an overwrite protection to a core dump of the dump file, restarting the kernel through a warm reboot of the kernel such that the core dump is not erased from the functional memory, and transferring the core dump to a system file using the kernel.

19 Claims, 10 Drawing Sheets

U.S. PATENT DOCUMENTS

| | | |
|---|---|---|
| 7,594,139 B2 * | 9/2009 | Nellitheertha ................ 714/20 |
| 7,631,224 B2 * | 12/2009 | Oguma ........................ 714/37 |
| 2004/0006546 A1 * | 1/2004 | Wedlake et al. ............... 706/46 |
| 2005/0204107 A1 * | 9/2005 | Narayan et al. ............. 711/162 |
| 2005/0210077 A1 * | 9/2005 | Balakrishnan et al. ...... 707/200 |
| 2006/0041739 A1 * | 2/2006 | Iwakura et al. ................. 713/2 |
| 2006/0075299 A1 * | 4/2006 | Chandramouleeswaran et al. ........................... 714/38 |
| 2006/0156057 A1 * | 7/2006 | Babu ............................. 714/5 |
| 2007/0074016 A1 * | 3/2007 | Alpers et al. .................... 713/2 |
| 2007/0168739 A1 * | 7/2007 | Wang et al. .................... 714/36 |
| 2008/0126879 A1 * | 5/2008 | Tiwari et al. .................. 714/46 |
| 2009/0172409 A1 * | 7/2009 | Bullis et al. .................. 713/189 |
| 2009/0228743 A1 * | 9/2009 | Ponnuswamy ............... 714/48 |

\* cited by examiner

WARM REBOOT ENABLED KERNEL DUMPER

CLAIM OF PRIORITY

This application claims priority from the Patent Application filed in India having Serial No. 1566/DEL/2007 titled "Warm Reboot Enabled Kernel Dumper" filed on Jul. 25, 2007.

FIELD OF TECHNOLOGY

The present disclosure relates generally to the technical fields of software and/or hardware in internetworking.

BACKGROUND

A kernel may be a central component of a computer operating system (e.g., QnX neutrino, ION, ENA, Linux, etc.). The kernel may manage the computer operating system's resources and/or the communication between hardware and software components. A core dump (e.g., a file containing a memory image of the operating system's process and/or values of processor registers) may record working memory of the operating system at a specific time, generally when the operating system is terminated abnormally (e.g., crashed). The core dump (e.g., the core file) may allow a user to perform a later and/or off site analysis of the operating system.

In some of the computer operating systems, such as the QnX neutrino, a special module called a kernel dumper may run and/or collect the core dump when the kernel crashes. Since a sanity of drivers associated with the kernel may not be assumed, the kernel dumper should not use the drivers to dump the core dump when the kernel crashes. As a result, the kernel dumper may be self contained and/or carry its own set of drivers (e.g., for dumping the core dump). The drivers (e.g., independent from the operating system) may add cost to the system. Additionally, maintaining and/or updating the computer operating systems and the kernel dumper across the system (e.g., the machine and the drivers) may make it more difficult to maintain across platforms and releases.

Overview

In one embodiment, a method of a kernel dumper module in a machine includes generating a dump file associated with a kernel when the kernel crashes, storing the dump file to a functional memory upon applying an overwrite protection to a core dump of the dump file, restarting the kernel through a warm reboot of the kernel such that the core dump is not erased from the functional memory, and transferring the core dump to a system file using the kernel. An exception handler may handle a kernel dumper execution when the kernel crashes.

In another embodiment, an apparatus includes a kernel of an inter-network operating system to reside in a memory of a router, and a kernel dumper module associated with the kernel to store a dump file to the memory of the router without resorting to a ROMMON mode when the kernel of the inter-network operating system crashes.

In yet another embodiment, a system includes a first network with at least one node, a second network with at least one node, and a router (e.g., may include a kernel dumper module to store a core dump to an available memory of the router when a kernel of the router crashes and restart the kernel without resorting to a ROMMON mode of the router) to communicate data packets between the first network and the second network through a communication path between the first network and the second network.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF EXAMPLE EMBODIMENTS

Example embodiments are illustrated by way of examples and not limitation in the figures of the accompanying drawings, in which like references indicate similar elements and in which.

Other features of the present embodiments will be apparent from the accompanying drawings and from the detailed description that follows.

DESCRIPTION OF EXAMPLE EMBODIMENTS

Warm reboot enabled kernel dumper is disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a method of a kernel dumper module (e.g., the kernel dumper module 106 of FIG. 1) in a machine includes generating a dump file associated with a kernel (e.g., the kernel 208 of FIG. 2) when the kernel 208 crashes, storing the dump file to a functional memory (e.g., the additional memory 210 of FIG. 2) upon applying an overwrite protection to a core dump of the dump file, restarting the kernel 208 through a warm reboot of the kernel 208 such that the core dump is not erased from the functional memory 210, and transferring the core dump to a system file using the kernel 208.

In another embodiment, a router (e.g., the router 104 of FIGS. 1 and 2) includes a kernel 208 of an inter-network operating system to reside in a memory (e.g., the memory 204 of FIG. 2) of the router 104, and a kernel dumper module 106 associated with the kernel 208 to store a dump file to the memory 204 of the router 104 without resorting to a Read Only Memory Monitor (ROMMON) mode when the kernel 208 of the inter-network operating system crashes.

In yet another embodiment, a system includes a first network (e.g., network 1 100 of FIG. 1) with at least one node, a second network (e.g., the network 2 102 of FIG. 1) with at least one node, and a router 104 to communicate data packets between the first network 1 100 and the second network 2 102 through a communication path between the first network 1 100 and the second network 2 102 and to include a kernel dumper module 106 to store a core dump to an available memory (e.g., the available memory 210 of FIG. 2) of the router 104 when a kernel (e.g., the kernel 208 of FIG. 2) of the router 104 crashes and restart the kernel 208 without resorting to a ROMMON mode of the router 104.

Figure 1:
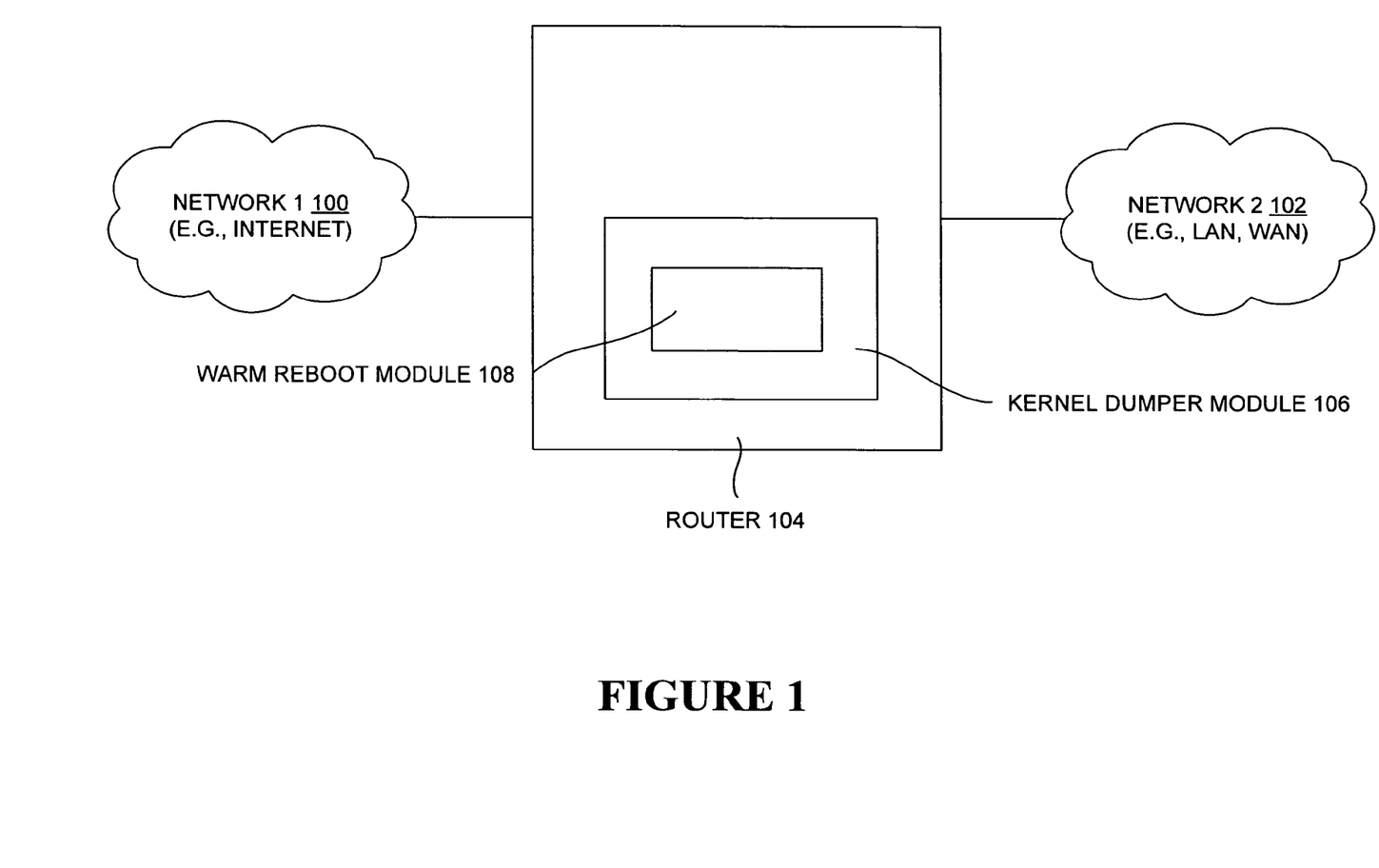
FIG. 1 illustrates an example system view of a router with a warm reboot module directing data traffic between a first network and a second network.

FIG. 1 illustrates an example system view of a router 104 with a warm reboot module 108 directing data traffic between a network 1 100 and a network 2 102. Particularly, FIG. 1 illustrates the network 1 100, the network 2 102, the router 104, a kernel dumper module 106 and a warm reboot module 108, according to one embodiment.

The network 1 100 may be a network (e.g., having a node(s)) coupled to the router 104 to transmit (e.g., through packet switching) data packets (e.g., blocks of data) to the network 2 102 using standard Internet Protocol (IP). The network 2 102 may be a network (e.g., LAN, WAN) consisting of node(s) that receives the data packets form network 1 100 via the router 104.

The router 104 may be a computer networking device that buffers and/or forwards data packets across an inter-network towards their destinations (e.g., the network 1 100 and the network 2 102 of FIG. 1). The router 104 may manage a recovery operation (e.g., may include storing of a dump file and transferring of a core dump) of a dump file (e.g., a file containing a memory image(s) of an operating system's process and/or values of processor registers) associated with a kernel (e.g., the kernel 208 of FIG. 2) of the router 104 when the kernel 208 crashes.

The kernel dumper module 106 embedded in the router 104 may recover the dump file of the kernel 208 when the kernel 208 crashes. The kernel dumper module 106 may work with interrupts disabled to collect files to be dumped from the crashed kernel 208 and store the dump file to the available memory 210 (e.g., without using the kernel resources). The warm reboot module 108 performs a warm reboot of the kernel 208 through restarting the kernel 208, without resorting to a ROMMON mode of the router 104.

In the example embodiment illustrated in FIG. 1, the router 104 communicates with the network 1 100 and the network 2 102. The router 104 consists of the kernel dumper module 106 in which the warm reboot module 108 is embedded.

Figure 2:
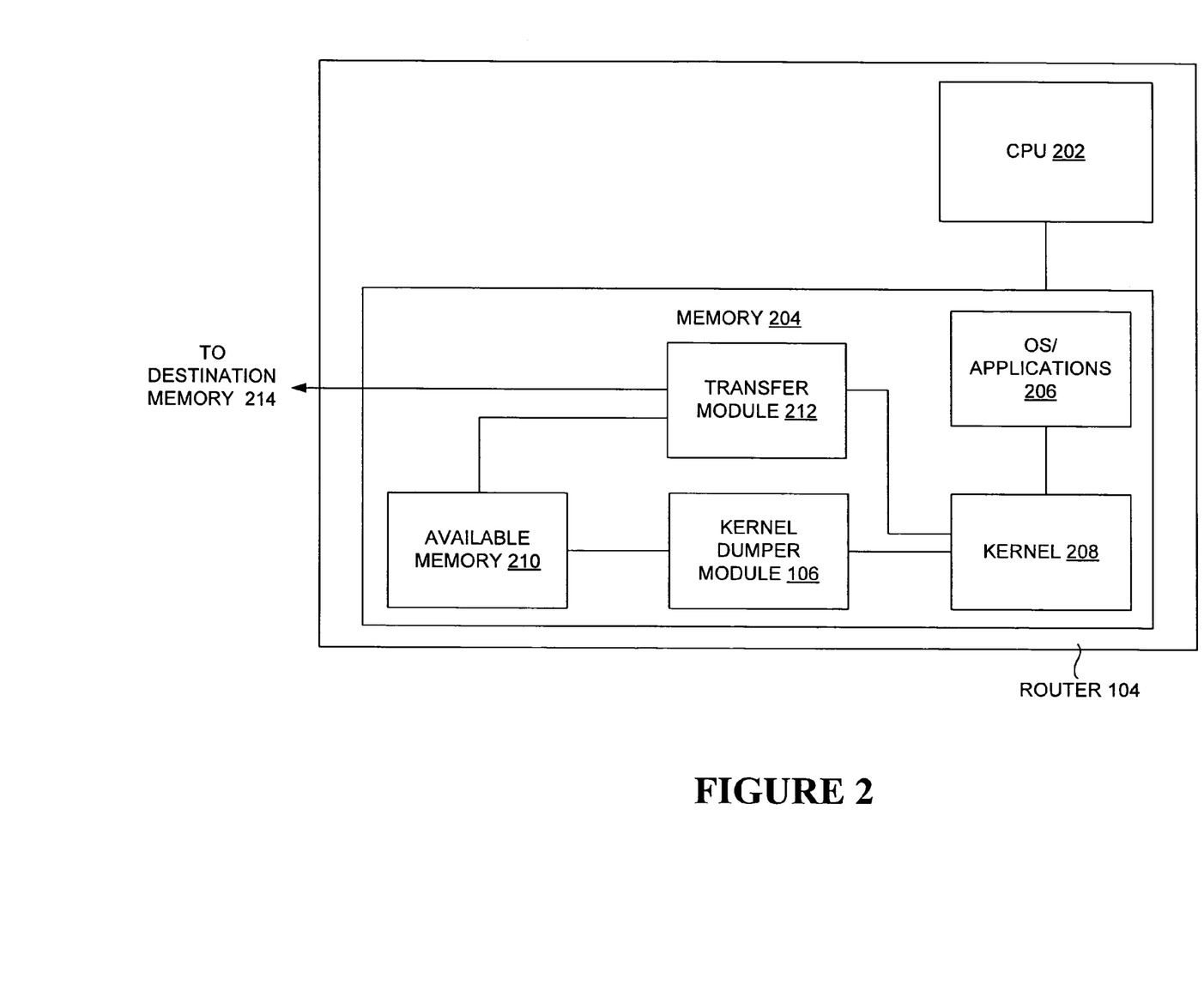
FIG. 2 illustrates an example block diagram the router of FIG. 1.

Furthermore, the first network 1 100 and the second network 2 102 may include a node. The router 104 (e.g., may include the kernel dumper module 106 to store a core dump to the available memory 210 of the router 104 when the kernel 208 of the router 104 crashes and restart the kernel 208 without resorting to the ROMMON mode of the router 104) may communicate data packets between the first network 1 100 and the second network 2 102 through a communication path between the first network 1 100 and the second network 2 102.

FIG. 2 illustrates an example block diagram the router of FIG. 1. Particularly, FIG. 2 illustrates the kernel dumper module 106, a Central Processing Unit (CPU) 202, a memory 204, an Operation System (OS)/applications 206, a kernel 208, an available memory 210, a transfer module 212, and a destination memory 214, according to one embodiment.

The kernel dumper module 106 may store a dump file of the kernel 208 in the available memory 210 and/or transfer a core dump (e.g., interesting pages) of the dump file to a system file using kernel resources. For example, the transferring of the core dump may take place upon restarting the kernel 208 through a warm reboot. The CPU 202 may be a processor of the router 104 which buffers and/or processes the data packets communicated through the network 1 100 and the network 2 102 during normal operation of the kernel 208. The memory 204 of the router 104 may be a storage device used to store a set of instructions associated with the OS/applications 206, the kernel 208, the kernel dumper module 106, etc.

The OS/applications 206 may be a set of computer programs (e.g., QnX neutrino, ION, ENA, Linux, etc.) that manage hardware and/or software resources of the router 104 in conjunction with the kernel 208. The operating system/applications 206 may process raw system and user input and may respond by allocating and/or managing tasks and internal system resources as a service to users and programs of the router 104.

The kernel 208 may be a central component of the operating system of the router 104 which manages resources and/or communication between hardware and/or software components. The kernel 208 may provide a lowest-level abstraction layer for the resources (e.g., the CPU 202, the available memory 210 and I/O devices) that the OS/applications 206 must control to perform their function. When the kernel 208 crashes, an exception handler may handle an execution through the kernel dumper module 106. Further, a dump file associated with the kernel 208 may be generated and stored in the available memory 210 prior to restarting the kernel 208 through a warm reboot (e.g., performed using the warm reboot module 108 of FIGS. 1 and 3). Once the core dump of the dump file is restored in the kernel 208, the core dump may be debugged using a kernel analyzer.

The available memory 210 may be a functional memory (e.g., a random access memory) of the router 104 in which the dump file (e.g., consisting of interesting and/or uninteresting pages) is stored by the kernel dumper module 106. The available memory 210 may be allocated for reuse upon transferring the core dump of the dump file to a system file of the kernel 208. The transfer module 212 may transport the core dump stored in the available memory 210 to a destination memory 214 (e.g., a system file) of the kernel 208. Upon transferring the core dump to the kernel 208, the available memory 210 can be reclaimed and reused by the router 104.

In the example embodiment illustrated in FIG. 2, the memory 204 includes the kernel dumper module 106, the OS/applications 206, the kernel 208 and the available memory 210. The CPU 202 of the router 104 communicates with the memory 204.

A dump file associated with the kernel 208 may be generated when the kernel 208 crashes. The dump file may be written to the available memory 210 (e.g., may include a functional memory 210 of the router 104) of the router 104 when the kernel 208 crashes. The dump file may be stored to the functional memory 210 upon applying an overwrite protection to a core dump of the dump file. An exception handler may handle kernel dumper execution when the kernel 208 crashes.

The kernel 208 of an inter-network operating system resides in the memory 204 of the router 104. The kernel dumper module 106 associated with the kernel 208 may store a dump file to the memory 204 of the router 104 without resorting to a ROMMON mode when the kernel 208 of the inter-network operating system crashes.

Figure 3:
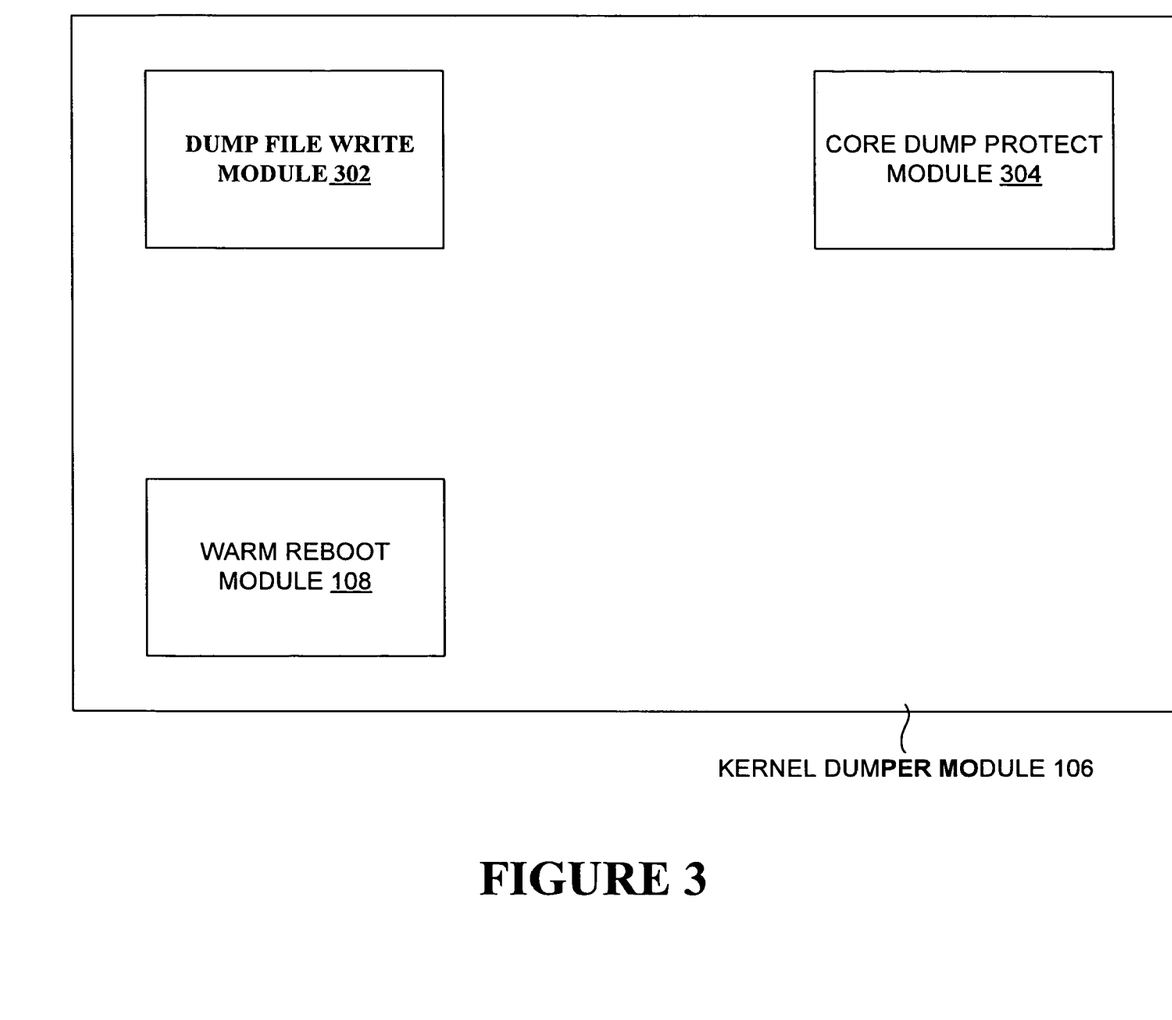
FIG. 3 illustrates an example exploded view of the kernel dumper module of FIG. 1.

FIG. 3 illustrates an example exploded view of the kernel dumper module 106 of FIG. 1. Particularly, FIG. 3 illustrates the warm reboot module 108, a dump file write module 302, and a core dump protect module 304, according to one embodiment.

The warm reboot module 108 may restore the kernel 208 through restarting the kernel 208 without resorting to a ROMMON mode of the router 104. In one example embodiment, the ROMMON mode is bypassed during restarting of the kernel 208 to prevent erasing of the dump file from the available memory 210 of the router 104. In other words, a warm reboot ensures that a core dump of the dump file in the available memory 210 of the router 104 remains untouched. Also, restoring of a syspage state and initialized data (e.g., saved in a reserved memory during a cold booting of the router 104) to a first instruction of the kernel 208 during the warm reboot of the kernel may enable bypassing of the ROMMON mode of the router 104.

During the warm reboot of the kernel 208, the core dump of the dump file may be protected by adding attributes to interesting pages (e.g., the core dump). Once the kernel 208 is warm rebooted, all the services of the kernel 208 are up and thus the kernel dumper module 106 can utilize kernel resources (e.g., set of drivers) for transferring the core dump of the dump file to the kernel 208. In some embodiment, the warm reboot may be terminated if the available memory 210 is smaller than a memory required to perform storing of the interesting pages (e.g., the core dump) of the dump file. Furthermore, the termination of the warm reboot may be followed by a cold reboot of the router 104.

The dump file write module 302 may write a dump file associated with the kernel 208 to the available memory 210 of the router 104. The core dump protect module 304 may apply a overwrite protection to a core dump of the dump file in the available memory 210. The dump file is marked as protected in the available memory 210 such that the dump file is not overwritten until transfer of the core dump takes place. In the example embodiment illustrated in FIG. 3, the kernel dumper module 106 embeds the warm reboot module 108, the dump file write module 302, and the core dump protect module 304.

The kernel 208 may be restarted through a warm reboot (e.g., performed through the warm reboot module 108 of FIGS. 1 and 3) of the kernel 208 such that a core dump is not erased from the functional memory 210. The core dump may be transferred to a system file using the kernel 208. The dump file write module 302 of the kernel dumper module 106 may write a core dump of the dump file to the memory 204 of the router 104 when the kernel 208 crashes. The core dump protect module 304 of the kernel dumper module 106 may apply an overwrite protection to the core dump in the memory 204 of the router 104.

Figure 4A:
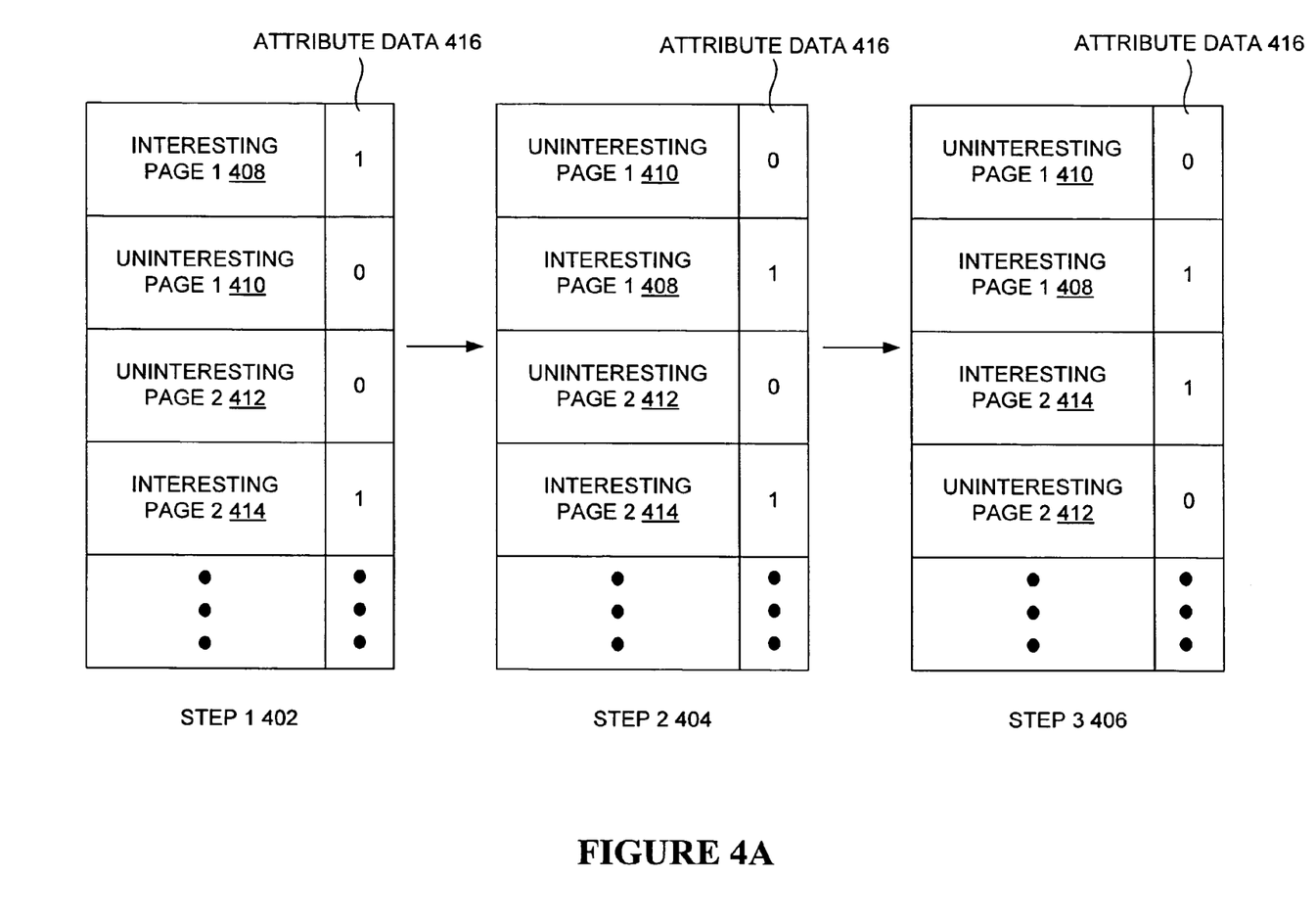
FIG. 4A illustrates an example process view of forming a memory block of interesting pages through swapping of the interesting pages and uninteresting pages of dump file.

FIG. 4A illustrates an example process view of forming a memory block of interesting pages (e.g., the interesting pages 1 408 and 2 414) through swapping of the interesting pages and uninteresting pages (e.g., the uninteresting pages 1 410 and 2 412) of a dump file. The interesting pages 1 408 and 2 414 may constitute a core dump (e.g., a file containing a memory image of the operating system's process and/or values of processor registers) of a dump file that is stored in the available memory 210 of the router 104 when the kernel 208 crashes. Rest of the pages in the available memory 210 may constitute the uninteresting pages (e.g., the uninteresting pages 1 410 and 2 412). The attribute data 416 may be added to the interesting pages 1 408 and 2 414 in order to protect the interesting pages 1 408 and 2 414 from being erased during the warm reboot of the kernel 208.

In the example embodiment, FIG. 4A illustrates steps to form the memory block of interesting pages 1 408 and 2 414. In the example embodiment illustrated in FIG. 4A, Step 1 402 illustrates a stack of dumped files in the available memory 210 including the interesting pages 1 408 and 2 414 and the uninteresting pages 1 410 and 2 412. The pages may be dumped to the available memory in a random fashion when the dump files are stored in the available memory 210. The attribute data 416 may be added to each of the interesting data 1 408 and 2 414 to protect them from being erased from the available memory 210 during a warm rebooting of the kernel 208.

Step 2 404 illustrates swapping of the interesting page 1 408 and the uninteresting page 1 410. The interesting page 1 408 is swapped for the uninteresting page 1 410 such that the interesting page 1 408 is drawn downwards in the available memory 210. Step 3 406 illustrates swapping of the interesting page 2 414 and the uninteresting page 2 412. The interesting page 2 414 is swapped for the uninteresting page 2 412 such that the interesting page 2 414 is drawn upwards in the available memory 210. As a result, the interesting pages 1 408 and 2 414 may be stacked (e.g., adjacent to each other) to form a memory block (e.g., a block of the interesting pages 1 408 and 2 414 as illustrated in step 3 406 of FIG. 4A).

As illustrated in FIG. 4A, the interesting pages 1 408 and 2 414 and the uninteresting pages 1 410 and 2 412 of the dump file are swapped for each other in the available memory 210 to form one big chunk of memory constituting the interesting pages. The core dump of the dump files (e.g., the interesting pages 1 408 and 2 414) may be written starting from top and grows downward in the available memory 210 forming a big chunk of a memory block. Once the big chunk of memory block of the interesting pages 1 408 and 2 414 in the available memory 210 is formed, the interesting pages are compressed on the fly.

For example, the interesting pages 1 408 and 2 414 of a dump file may be stored from a top of the available memory 210 (e.g., a random access memory). The attribute data 416 may be added to each of the interesting pages 1 408 and 2 414 of the core dump to protect the interesting pages 1 408 and 2 414 of the dump file during the warm reboot of the kernel 208.

The interesting pages 1 408 and 2 414 of the dump file may be compressed on the fly after the interesting pages 1 408 and 2 414 are stacked to form a block. An upper limit of the dump file may be set based on the available memory 210 of the router 104 during the cold booting of the router 104.

The warm reboot of the kernel 208 may be terminated when the available memory 210 of the router 104 is smaller than a memory required to perform the storing the interesting pages 1 408 and 2 414 of the dump file. A cold-reboot of the router 104 may be performed when the warm reboot is terminated.

Figure 4B:
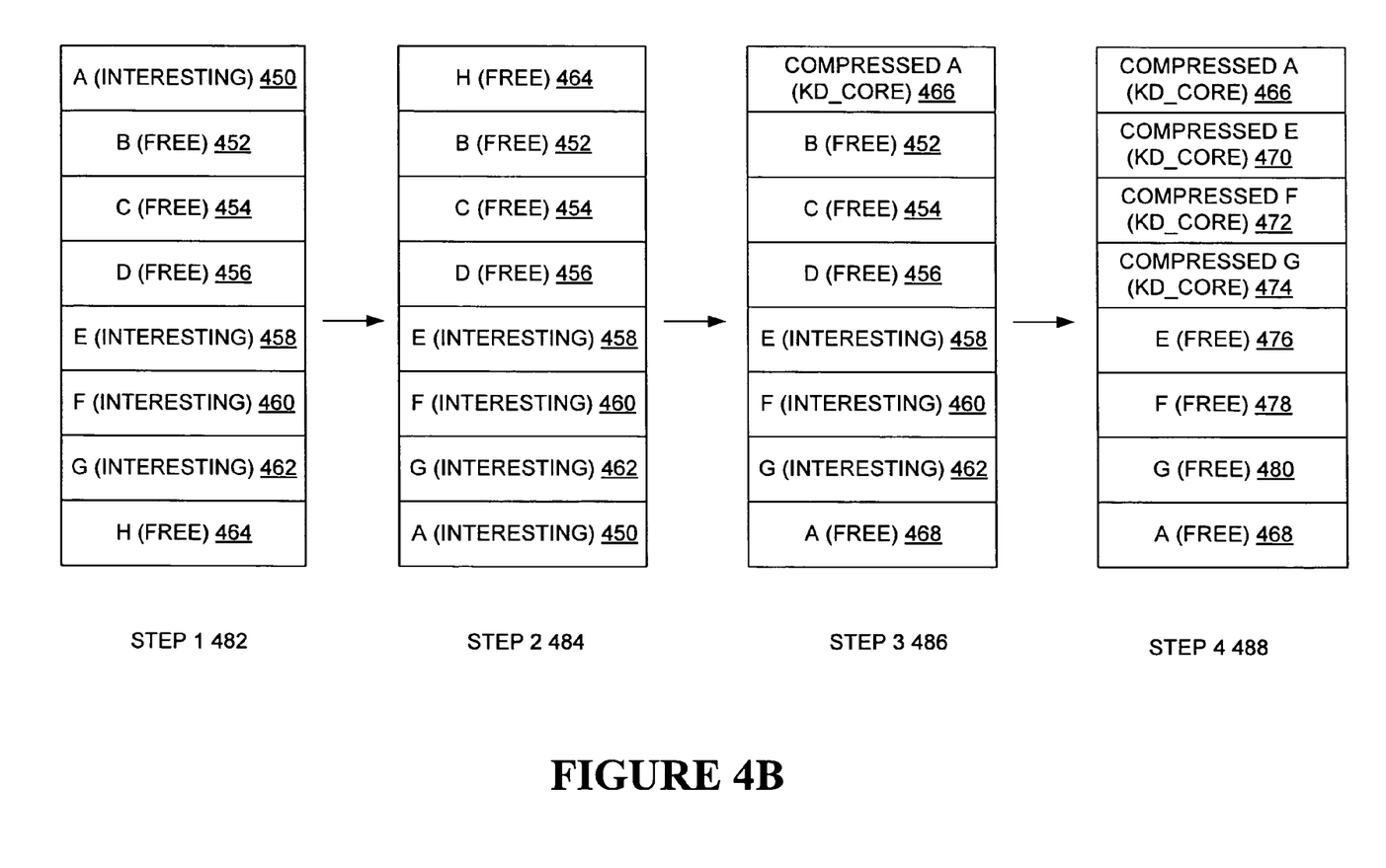
FIG. 4B illustrates an example process view of forming a region of free pages in the dump file to fill the region with interesting pages.

FIG. 4B illustrates an example process view of forming a region of free pages in the dump file to fill the region with interesting pages. In step 1 482, an A (interesting page) 450 of the dump file is swapped with a H (free) 464 to create a region of free spaces including the H (free) 464, a B (free) 452, a C (free) 454, and a D (free) 456. In step 2 484, a new page frame number (pfn) of the A (interesting page) 450 is stored to a data structure which points to the H (free) 464. Then, starting from the top of the dump file, the first interesting page to be dumped is identified.

In step 3 486, because the A (interesting page) 450 is the first interesting page to be dumped, the content of the A (interesting page) 450 is compressed on the fly and is written to the H (free) 464. Then, the A (interesting page) is marked as a A (free) 468, and the H (free) 464 is occupied by a compressed A (kd_core) 466.

In step 4 488, the rest of the free pages in the region (e.g., the B (free) 452, the C (free) 454, and the C (free) 456) are filled with the interesting pages (e.g., an E (interesting page) 458, a F (interesting) 460, and a G (interesting) 462). As in step 3 486, the pages are marked to create core dump pages (e.g., a compressed E (kd_core) 470, a compressed F (kd_core) 472, and a compressed G (kd_core) 474) and free pages (e.g., an E (free) 476, a F (free) 478, and a G (free) 480).

This algorithm illustrated in FIG. 4B may allow a faster writing of the core dump because it may be faster to create a contiguous region of free pages than interesting pages when the number of free pages is less than that of the interesting pages.

Figure 5:
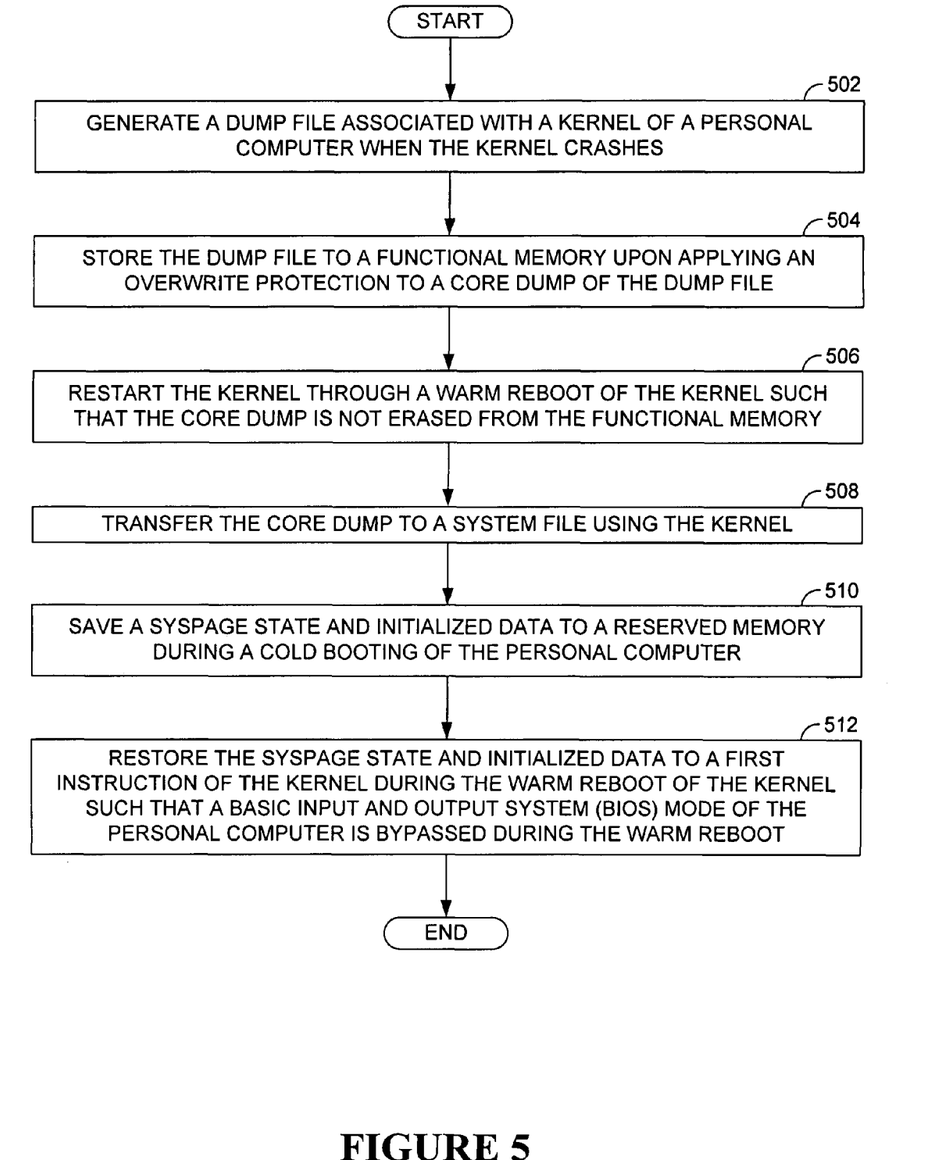
FIG. 5 illustrates an example process flow chart of storing a core dump to an available memory of a personal computer without resorting to a BIOS mode of the personal computer.

FIG. 5 illustrates an example process flow chart of storing a core dump to an available memory 210 of a personal computer without resorting to a Basic Input and Output System (BIOS) mode of the personal computer. In operation 502, a dump file associated with a kernel of the personal computer is generated when the kernel 208 crashes. In operation 504, the dump file is stored to a functional memory upon applying an overwrite protection to the core dump (e.g., a file containing a memory image of an operating system's process and/or values of processor registers) of the dump file.

In operation 506, the kernel 208 is restarted through a warm reboot of the kernel 208 such that the core dump is not erased from the functional memory 210. In operation 508, the core dump is transferred to a system file using the kernel 208. In operation 510, a syspage state and initialized data are saved to a reserved memory during a cold booting of the personal computer. In operation 512, the syspage state and initialized data are restored to a first instruction of the kernel 208 during the warm reboot of the kernel 208 of the personal computer such that the (BIOS) mode of the personal computer is bypassed during the warm reboot of the kernel 208.

Figure 6A:
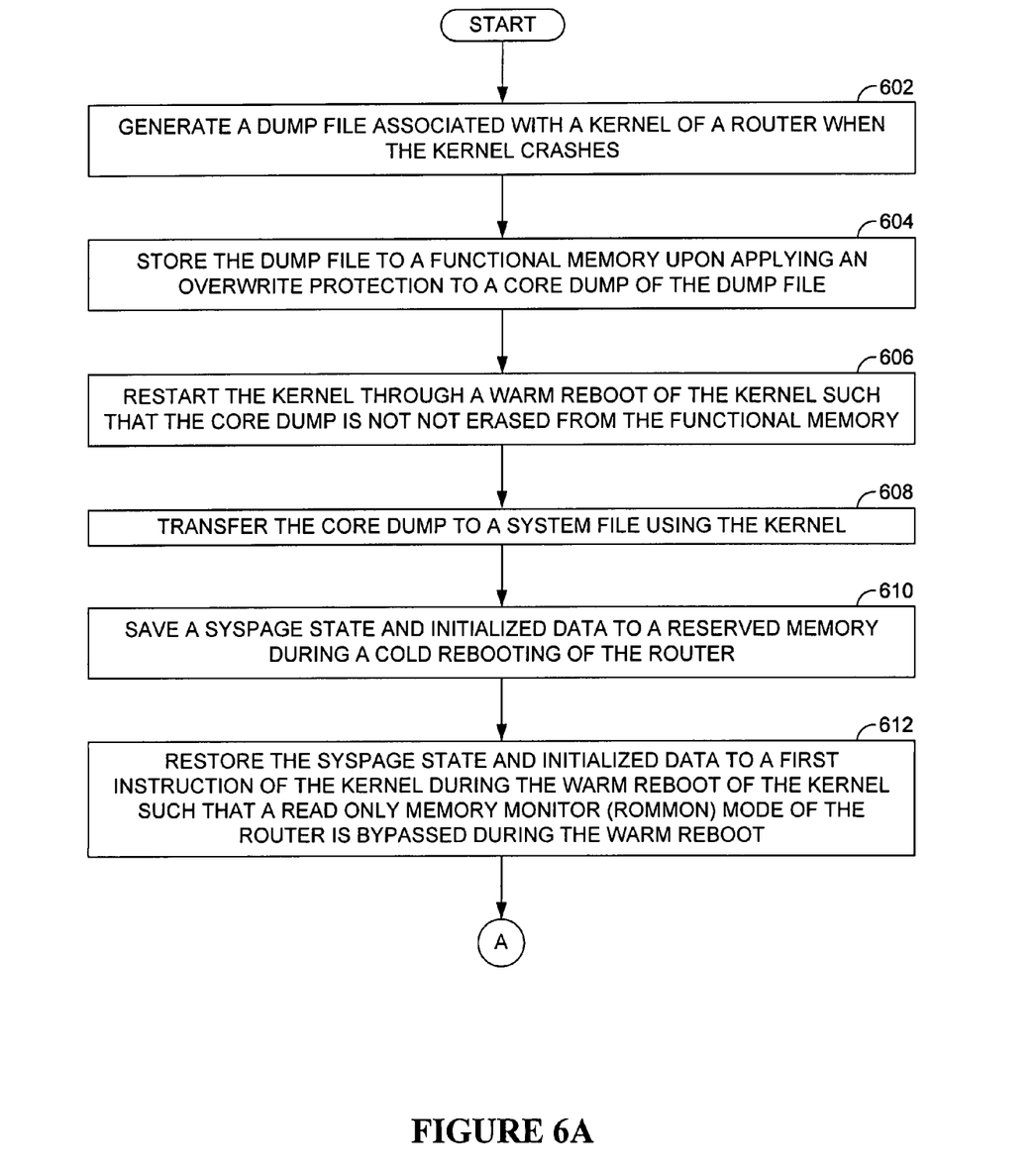
FIG. 6A illustrates an example process flow chart of storing a core dump to an available memory of a router without resorting to a ROMMON mode of the router.

FIG. 6A illustrates an example process flow chart of storing a core dump to an available memory 210 of a router 104 without resorting to a Read Only Memory Monitor (ROM-MON) mode of the router 104. In operation 602, a dump file associated with a kernel (e.g., the kernel 208 of FIG. 2) of the router 104 is generated when the kernel 208 crashes. In operation 604, the dump file is stored (e.g., using the dump file write module 302 of FIG. 3) to a functional memory (e.g., the available memory 210 of FIG. 2) upon applying an overwrite protection (e.g., through the core dump protect module 304 of FIG. 3) to the core dump (e.g., a file containing a memory image of the operating system's process and/or values of processor registers) of the dump file.

In operation 606, the kernel 208 is restarted through a warm reboot (e.g., using the warm reboot module 108 of FIG. 1 and 3) of the kernel 208 such that the core dump is not erased from the functional memory 210. In operation 608, the core dump is transferred (e.g., the transfer module 212 of FIG. 2) to a system file using the kernel 208.

In operation 610, a syspage stage and initialized data are saved to the reserved memory during a cold booting of the router 104. In operation 612, the syspage stage and initialized data are restored to a first instruction of the kernel 208 during the warm reboot of the kernel 208 such that the ROMMON mode of the router 104 is bypassed during the warm reboot of the kernel 208.

Figure 6B:
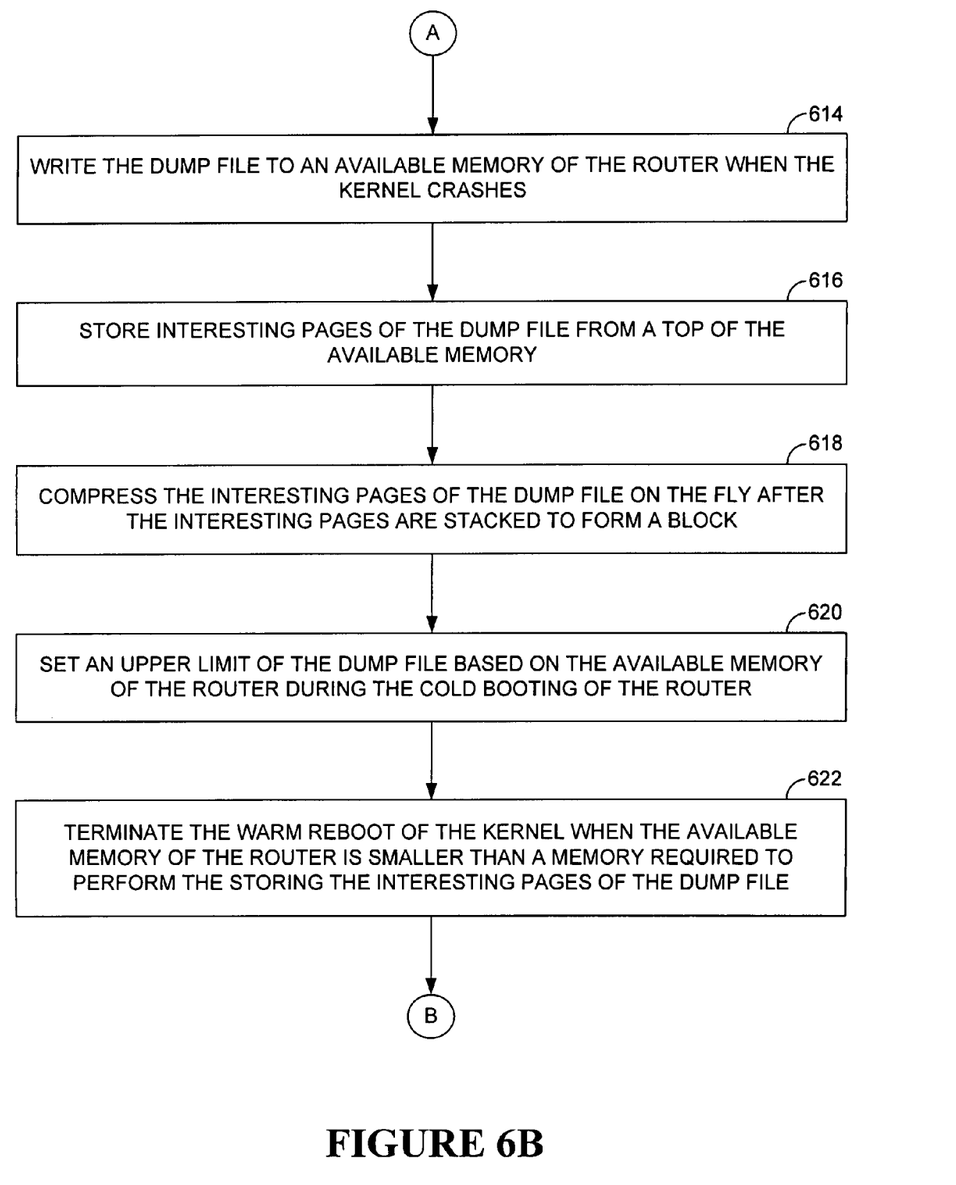
FIG. 6B illustrates a continuation of the example process flow chart of FIG. 6A, showing additional processes.

FIG. 6B illustrates a continuation of the example process flow chart of FIG. 6A, showing additional processes. In operation 614, the dump file is written (e.g., using the dump file write module 302 of FIG. 3) to the available memory 210 of the router 104 when the kernel 208 crashes. In operation 616, interesting pages (e.g., the interesting page 1 408, the interesting page 2 414 of FIG. 4A) of the dump file are stored from a top of the available memory 210.

In operation 618, the interesting pages 1 408 and 2 414 of the dump file are compressed on the fly after the interesting pages 1 408 and 2 414 are stacked to form a block. In operation 620, an upper limit of the dump file is set based on the available memory 210 of the router 104 during the cold booting of the router 104. In operation 622, the warm reboot of the kernel 208 is terminated when the available memory 210 of the router 104 is smaller than a memory required to perform the storing the interesting pages of the dump file.

Figure 6C:
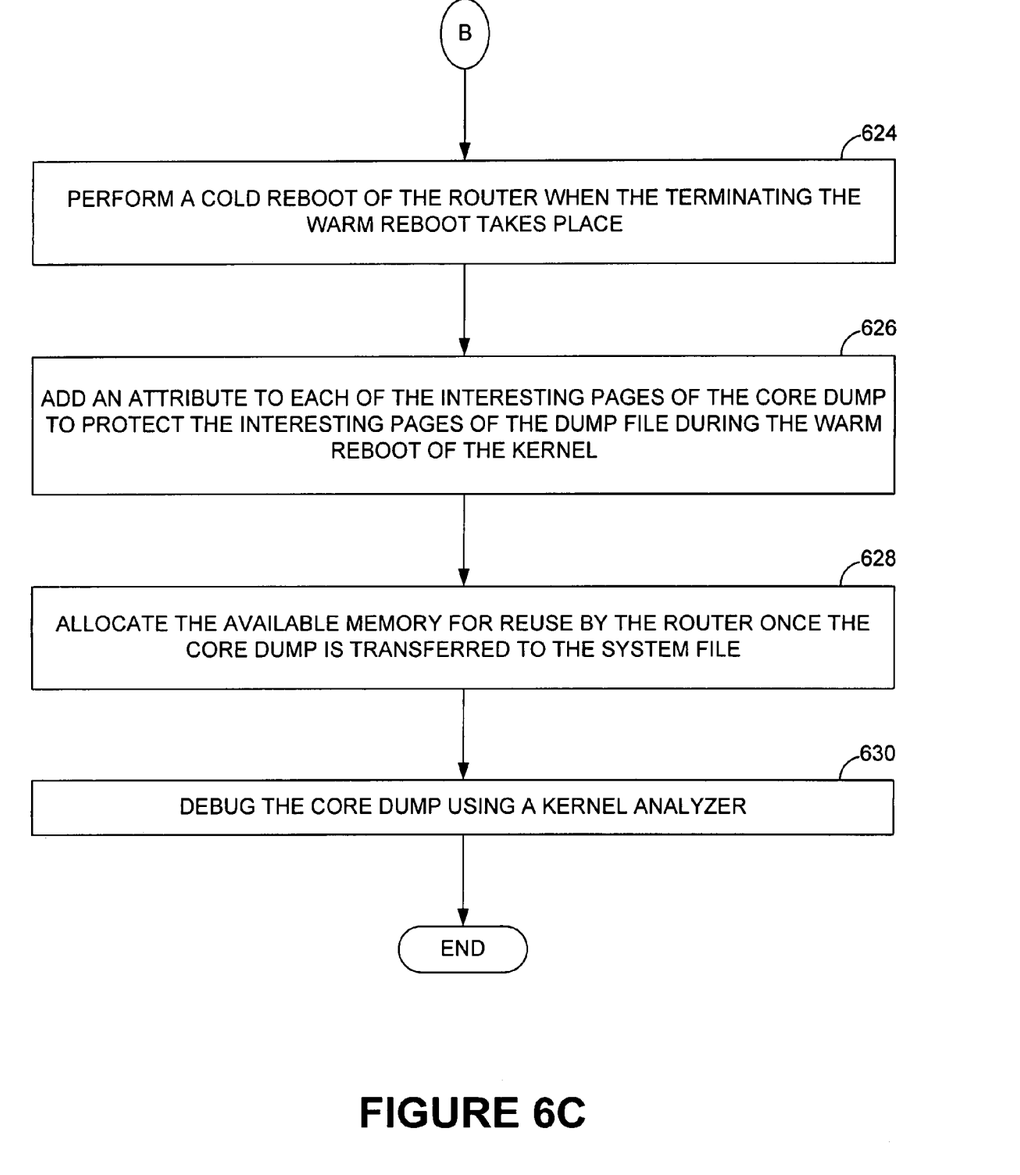
FIG. 6C illustrates a continuation of the example process flow chart of FIG. 6B, showing additional processes.

FIG. 6C illustrates a continuation of the example process flow chart of FIG. 6B, showing additional processes. In operation 624, a cold-reboot of the router 104 is performed when the terminating the warm reboot takes place. In operation 626, an attribute (e.g., the attribute data 416 of FIG. 4A) is added to each of the interesting pages of the core dump to protect the interesting pages (e.g., using the core dump protect module 304 of FIG. 3) of the dump file during the warm reboot of the kernel 208. In operation 628, the available memory 210 is allocated for reuse by the router 104 once the core dump is transferred (e.g., through the transfer module 212 of FIG. 2) to the system file. In operation 630, the core dump is debugged using a kernel analyzer.

Figure 7:
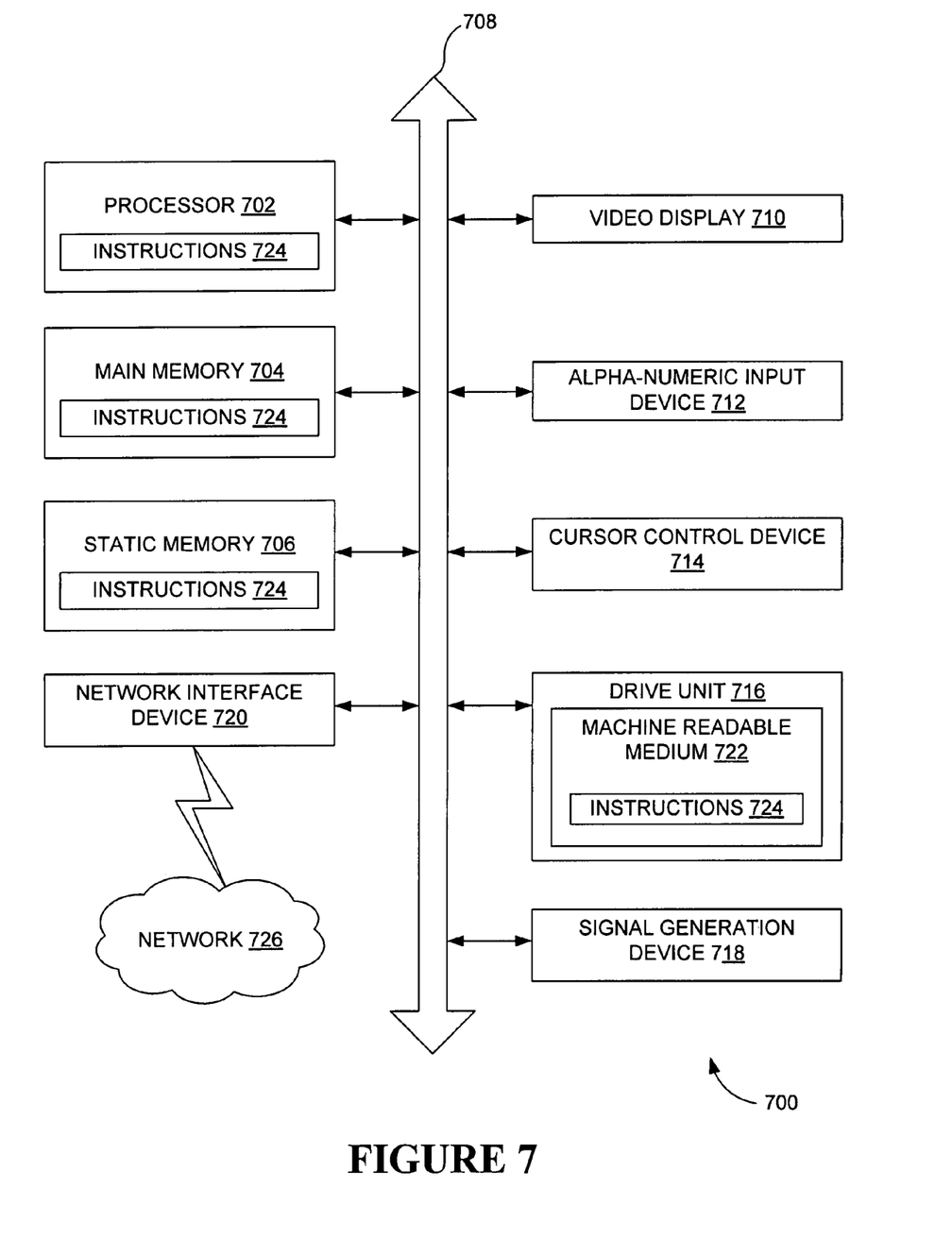
FIG. 7 illustrates an example diagrammatic system view of a data processing system in which any of the embodiments disclosed herein may be performed.

FIG. 7 illustrates an example diagrammatic system view 700 of a data processing system in which any of the embodiments disclosed herein may be performed. Particularly, the diagrammatic system view 700 of FIG. 7 illustrates a processor 702, a main memory 704, a static memory 706, a bus 708, a video display 710, an alpha-numeric input device 712, a cursor control device 714, a drive unit 716, a signal generation device 718, a network interface device 720, a machine readable medium 722, instructions 724 and a network 726.

The diagrammatic system view 700 may indicate a personal computer and/or a data processing system in which one or more operations disclosed herein may be performed. The processor 702 may be a microprocessor, a state machine, an application-specific integrated circuit, a field programmable gate array, etc. (e.g., Intel® Pentium® processor). The main memory 704 may be a dynamic random access memory and/or a primary memory of a computer system. The static memory 706 may be a hard drive, a flash drive, and/or other memory information associated with the data processing system.

The bus 708 may be an interconnection between various circuits and/or structures of the data processing system. The video display 710 may provide graphical representation of information on the data processing system. The alpha-numeric input device 712 may be a keypad, a keyboard and/or any other input device of text (e.g., a special device to aid the physically challenged). The cursor control device 714 may be a pointing device such as a mouse.

The drive unit 716 may be the hard drive, a storage system, and/or other longer term storage subsystem. The signal generation device 718 may be a bios and/or a functional operating system of the data processing system. The network interface device 720 may be a device that performs interface functions such as code conversion, protocol conversion and/or buffering required for communication to and from the network 726.

The machine readable medium 722 may provide instructions on which any of the methods disclosed herein may be performed. The instructions 724 may provide source code and/or data code to the processor 702 to enable any one or more operations disclosed herein.

Although the present embodiments have been described with reference to specific example embodiments, it will be evident that various modifications and changes may be made to these embodiments without departing from the broader spirit and scope of the various embodiments.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method comprising:
   generating a dump file associated with a kernel when the kernel crashes;
   storing the dump file to a functional memory upon applying an overwrite protection to a core dump of the dump file;
   restarting the kernel through a warm reboot of the kernel such that the core dump is not erased from the functional memory;
   transferring the core dump to a system file using the kernel;
   saving a syspage state and initialized data during a cold booting of a machine; and
   restoring the syspage state and the initialized data to a first instruction of the kernel during the warm reboot of the kernel of the machine such that a Basic Input and Output System (BIOS) mode of the machine is bypassed during the warm reboot of the kernel.

2. The method of claim 1, wherein an exception handler handles a kernel dumper execution when the kernel crashes.

3. The method of claim 1, wherein the machine is a router or a personal computer.

4. The method of claim 1, further comprising restoring the syspage state and initialized data to a first instruction of the kernel during the warm reboot of the kernel of the machine such that a Read Only Memory monitor (ROMMON) mode of the machine is bypassed during the warm reboot of the kernel, wherein the machine is a router.

5. The method of claim 4, further comprising writing the dump file to an available memory of the router when the kernel crashes, wherein the available memory comprises the functional memory of the router.

6. The method of claim 5, further comprising storing interesting pages of the dump file from a top of the available memory.

7. The method of claim 6, further comprising compressing the interesting pages of the dump file on the fly after the interesting pages are stacked to form a block.

8. The method of claim 7, further comprising setting an upper limit of the dump file based on the available memory of the router during the cold booting of the router.

9. The method of claim 8, further comprising terminating the warm reboot of the kernel when the available memory of the router is smaller than a memory required to perform the storing the interesting pages of the dump file.

10. The method of claim 9, further comprising performing a cold reboot of the router when the terminating the warm reboot of the kernel takes place.

11. The method of claim 10, further comprising adding an attribute to each of the interesting pages of the core dump to protect the interesting pages during the warm reboot of the kernel.

12. The method of claim 11, further comprising allocating the available memory for reuse by the router once the core dump is transferred to the system file.

13. The method of claim 12, further comprising debugging the core dump using a kernel analyzer.

14. The method of claim 5, further comprising:
    swapping at least one free page of the dump file with a corresponding number of interesting pages of the dump file to generate a region of free pages in the dump file; and
    dumping interesting pages to fill the region of free pages with the interesting pages compressed on the fly.

15. An apparatus, comprising:
    a kernel of an inter-network operating system to reside in a memory of a router; and
    a kernel dumper module associated with the kernel to store a dump file to the memory of the router without resorting to a ROMMON mode when the kernel of the inter-network operating system crashes, wherein initialized data is saved during a cold booting of the router, and wherein restoration occurs for a syspage state and the initialized data to a first instruction of the kernel during the warm reboot of the kernel such that a Basic Input and Output System (BIOS) mode of the router is bypassed during the warm reboot of the kernel.

16. The apparatus of claim 15, further comprising a dump file write module of the kernel dumper module to write a core dump of the dump file to the memory of the router when the kernel crashes.

17. The apparatus of claim 16, further comprising a core dump protect module of the kernel dumper module to apply an overwrite protection to the core dump in the memory of the router.

18. The apparatus of claim 16, further comprising a transfer module associated with the kernel dumper module to copy the core dump to a system file.

19. A system, comprising:
    a machine configured to communicate data packets between a first network and a second network through a communication path between the first network and the second network, wherein the machine interfaces with a kernel dumper module to store a core dump to an available memory of the machine when a kernel of the machine crashes and to restart the kernel without resorting to a Read Only Memory monitor (ROMMON) mode, and wherein restoration occurs for a syspage state and initialized data to a first instruction of the kernel during a warm reboot of the kernel, and wherein the syspage state and the initialized data are saved during a cold booting of the machine.

* * * * *